United States Patent [19]

Malikowski et al.

[11] Patent Number: 4,980,243

[45] Date of Patent: Dec. 25, 1990

[54] DIRECT BONDING OF CERAMIC PARTS BY A SILVER ALLOY SOLDER

[75] Inventors: Willi Malikowski, Aschaffenburg; Wolfgang Weise, Frankfurt am Main, both of Fed. Rep. of Germany

[73] Assignee: Degussa Aktiengesellschaft, Frankfurt am Main, Fed. Rep. of Germany

[21] Appl. No.: 376,579

[22] Filed: Jul. 7, 1989

[30] Foreign Application Priority Data

Jul. 7, 1988 [DE] Fed. Rep. of Germany ....... 3822966

[51] Int. Cl.$^5$ ......................... B32B 15/04; C22C 5/06

[52] U.S. Cl. .................................... 428/621; 428/673; 428/457; 420/501

[58] Field of Search ........................ 420/501, 505, 506; 228/263.12; 428/457, 469, 472, 615, 673, 627, 632, 633, 621

[56] References Cited

U.S. PATENT DOCUMENTS 4,471,026 9/1984 Nicholas et al. ............... 228/263.12
4,621,761 11/1986 Hammond et al. ............ 228/263.12
4,623,513 11/1986 Mizuhara ............................ 420/501
4,630,767 12/1986 Mizuhara ........................ 228/263.12
4,667,871 5/1987 Mizuhara ........................ 228/263.12
4,711,386 12/1987 Mizuhara ........................ 228/263.12
4,785,989 11/1988 Mizuhara ........................ 228/263.12

FOREIGN PATENT DOCUMENTS 1174074 11/1958 France .
1174330 11/1958 France .
61-156657 7/1986 Japan .................................. 420/501
1546376 5/1979 United Kingdom ................ 420/501

OTHER PUBLICATIONS

Nesse, T., "Untersuchungen zum Aktivloeten von Keramik und Graphit", Metall, Mar. 1973, pp. 259-265.

*Primary Examiner*—John J. Zimmerman
*Attorney, Agent, or Firm*—Beveridge, DeGrandi & Weilacher

[57] ABSTRACT

Solders for directly soldering together ceramic parts consisting essentially of 70 to 99% silver, 0.5 to 15% by weight indium or 0.5 to 10% by weight tin and 0.5 to 15% by weight titanium or zirconium, or mixtures thereof. These solders are very ductile, are workable at comparatively low temperatures and provide very firm bonding.

9 Claims, No Drawings

DIRECT BONDING OF CERAMIC PARTS BY A SILVER ALLOY SOLDER

Background of Invention

The present invention relates to the use of a silver alloy as the solder when directly bonding ceramic parts to each other or ceramic to metal parts.

Ceramics alone or ceramics combined with metals allow making components combining the advantages of ceramics and of metals. However, the applicability of such components largely depends on suitable bonding methods.

In industry, ceramics are joined to other ceramics or to metals mostly by soldering metallized ceramics. For that purpose, a layer of manganese-molybdenum suspension is deposited on the solder zone of the ceramic and is baked into it at high temperature under a hydrogen atmosphere. The oxides produced at the boundary layer form spinels with the ceramic and thereby provide good adhesion. To improve solder wetting, typically a nickel layer will be added. The ceramic so metallized can be soldered using conventional hard-solders, for instance, silver-copper hard solders. This procedure however entails many steps and therefore is cumbersome.

A more economical bonding technique between ceramics and metals is provided by active soldering. Using so-called active solders, ceramic and metal parts can be bonded together in one operational step in the absence of prior ceramic metallization. Mainly silver, or silver-copper alloys with low proportions of titanium or zirconium are used as active solders. Typically, the titanium contents are between 0.5 and 5% by weight. At low titanium contents, these solders are ductile and can be easily processed into solder shapes. However significant degradation in forming takes place as the titanium content increases.

Binary silver-titanium alloys illustratively containing 1% titanium are known (French patent document No. 1,174,074). When bonding zirconium oxide to steel CK 45, such solders will offer shear strengths of 130 to 150 MPa. However, they incur the drawback of a comparatively high solidus temperature and hence of soldering temperature. The solidus temperature may be lowered by adding copper and therefore mainly silver-copper-titanium solders are used for active soldering ceramics, such solders illustratively containing 3% titanium and a silver-copper eutectic (see for instance METALL, 1973, pp. 259-65). However such solders exhibit less ductility than the silver-titanium solders. Furthermore solder alloys are known which contain 60 to 65% silver, 24 to 25% copper, 5 to 10% indium and about 5% titanium (French patent document No. 1,174,330). However, these solders entail the drawback that the addition of indium renders the alloys more brittle.

Summary of the Invention

Accordingly, it is an object of the present invention to discover a silver alloy to be used as solder in the direct bonding of ceramic parts to each other or to metal parts (steel, e.g. mild steel, CK 45, Fe-Cr steel) and exhibiting high ductility and offering high solder connection strength while simultaneously having a low soldering temperature.

In attaining the above and other objects, one feature of the invention resides in using an alloy of 70 to 99% by weight silver, 0.5 to 10% by weight tin or 0.5 to 15% by weight indium and 0.5 to 15% by weight titanium, zirconium and mixtures thereof.

Ceramic articles may include oxidic as well as non-oxidic, e.g. $Al_2O_3$, $ZrO_2$, SiC, $B_4C$, $Si_3N_4$. Metal parts include steels, Ni-based alloys, Fe-Ni alloys, among others.

Preferably alloys with 92 to 99% by weight silver, 0.5 to 4% by weight indium and 0.5 to 4% by weight titanium or 92 to 99% by weight silver, 0.5 to 10% by weight tin and 0.5 to 4% by weight titanium shall be used.

Surprisingly, it was found that indium can be added in amounts up to 15% by weight and tin in amounts up to 10% by weight to silver titanium alloys without thereby significantly degrading the ductility of such alloys. Contrary to the case of the cuprous silver-indium-titanium alloys, no brittle phase is formed, whereby even for titanium contents up to 15% by weight the alloys retain good forming properties. These alloys can be processed by cold-rolling with appropriate intermediate annealing into solder sheets. In addition to their high ductility, these solders also exhibit very high mechanical strength of ceramic-metal bonding and comparatively low operational temperatures.

Detailed Embodiment of the Invention

The alloys below were used successfully to solder ceramic parts of test pieces $20 \times 20 \times 6$ mm$^3$:

| Alloy Composition | Operational temperature | Bonding strength (shear) |
|---|---|---|
| Ag TiIn-95/4/1 | 1000° C. | 140–165 MPa |
| Ag TiIn-94/4/2 | 1000° C. | 140–160 MPa |
| Ag TiSn-95/4/1 | 1000° C. | 124–138 MPa |
| Ag InTi-85/10/5 | 960° C. | 105–110 MPa |
| Ag InTi-98.4/1/0.6 | 1000° C. | 135–140 MPa |
| Ag InTi-97.4/2/0.6 | 1000° C. | 135–145 MPa. |

All alloys exhibit good ductility and work ability.

Further variations and modifications of the foregoing will become apparent to those skilled in the art and are intended to be encompassed by the claims appended hereto.

We claim:

1. A copper-free silver alloy solder composition consisting essentially of 70 to 99% by weight silver, 0.5 to 15% by weight indium and 0.5 to 15% by weight titanium useful as solder for the direct bonding of ceramic parts to each other and of ceramic parts to metal parts.

2. A silver alloy solder composition as claimed in claim 1, consisting essentially of 92 to 99% by weight silver, 0.5 to 4% by weight indium and 0.5 to 4% weight titanium.

3. A ceramic article formed of at least two ceramic parts bonded to each other with the silver alloy of claim 1.

4. An article formed of a ceramic part bonded to a metal part by the silver alloy solder of claim 1.

5. A silver alloy solder composition as claimed in claim 1, exhibiting high ductility, very high mechanical strength of ceramic-metal bonding and comparatively low operational temperatures from about 960° C. to about 1000° C.

6. A copper-free silver alloy solder composition consisting essentially of 70 to 99% by weight silver and the balance is from 0.5 to 15% by weight indium and from 0.5 to 15% by weight titanium useful as solder for the direct bonding of ceramic parts to each other and of ceramic parts to metal parts and exhibiting high ductility and offering high solder connection strength while simultaneously having a low soldering temperature.

7. A silver alloy solder composition as claimed in claim 6, consisting essentially of 92 to 99% by weight silver and the balance is from 0.5 to 4% by weighty indium and from 0.5 to 4% by weight titanium.

8. A ceramic article formed of at least two ceramic parts bonded to each other with the silver alloy solder of claim 6.

9. An article formed of a ceramic part bonded to a metal part by the silver alloy solder of claim 6.

* * * * *